No. 609,942. Patented Aug. 30, 1898.
W. A. MADDIN.
FILTER.
(Application filed Oct. 4, 1897.)
(No Model.)
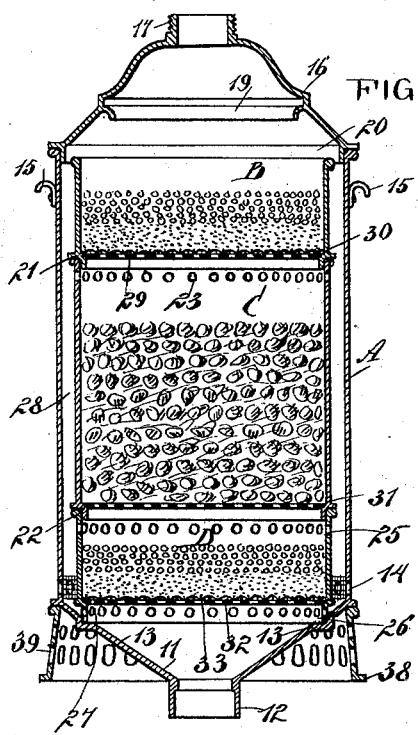
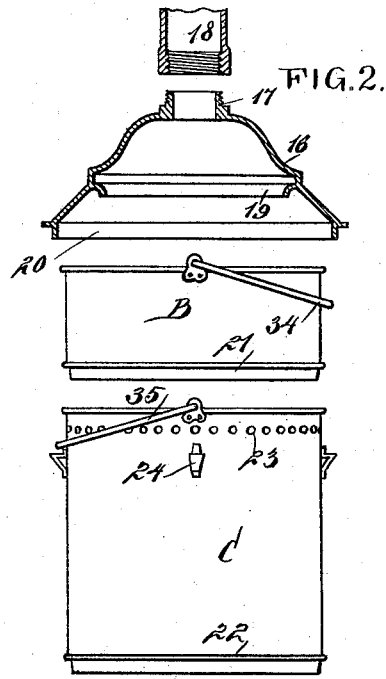
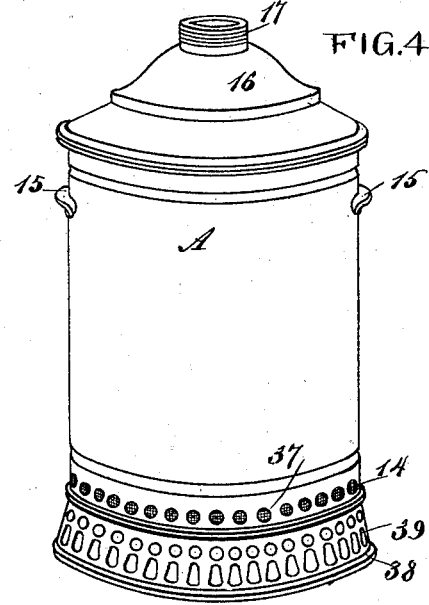
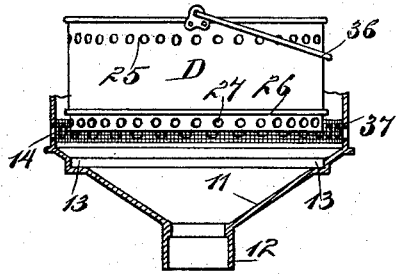
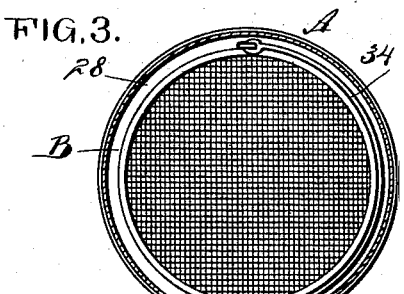
WITNESSES:
INVENTOR
W. A. Maddin
BY
ATTORNEYS.
THE NORRIS PETERS CO., PHOTO-LITHO., WASHINGTON, D. C.

UNITED STATES PATENT OFFICE.

WILLIAM A. MADDIN, OF MUSCOGEE, INDIAN TERRITORY.

FILTER.

SPECIFICATION forming part of Letters Patent No. 609,942, dated August 30, 1898.

Application filed October 4, 1897. Serial No. 653,979. (No model.)

*To all whom it may concern:*

Be it known that I, WILLIAM A. MADDIN, of Muscogee, Creek Nation, Indian Territory, have invented a new and Improved Filter, of which the following is a full, clear, and exact description.

The invention relates to that class of filters adapted to connect with a cistern and the down-spout leading to the cistern.

The object of the invention is to construct such a filter in a durable, simple, and economic manner and so that the filter may be readily separated from its connections and the several parts disconnected, cleaned, and replaced when necessary.

A further object of the invention is to provide perfect ventilation from the outside and complete and independent ventilation for each section.

Another object of the invention is to provide a continuous draft through the filter and pipe entering the cistern.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the filter in its complete form. Fig. 2 is a side elevation of the inner parts of the filter, the said parts being disconnected, and a vertical section through the top of the casing and the lower portion of the same. Fig. 3 is a horizontal section through the casing, showing one of the filtering-sections in plan view; and Fig. 4 is a detail perspective view of the filter viewed from the outside.

The casing A may be of any desired shape. Usually, however, it is circular, and the bottom 11 of the casing is made to taper downwardly to an outlet-pipe 12, adapted for connection with a cistern. In the upper portion of the bottom 11 of the casing an annular seat 13 is formed, and near the bottom of the casing apertures 14 are made in the upright portion of the casing, while near the top of the said upright portion of the casing handles 15 are secured.

A cover 16 is provided for the upper portion of the casing, which cover has a threaded sleeve 17 formed at its upper end to enter a down-spout 18. Within the cover an annular lip 19 is formed, which lip is curved downwardly and inwardly in cross-section, as is clearly shown in Figs. 1 and 2. The cover is provided with the usual flange 20, adapted to enter the casing.

The filter, which is adapted to be located in the casing A, is made in three sections—an upper section B, an intermediate section C, and a lower section D, the intermediate section C being preferably the longest. Each section is independent of the other, being complete in itself, although one section is to be placed upon the other, and the bottom section rests upon the seat 13 of the casing. The uppermost filter-section B is provided at its bottom with an angular marginal flange 21, the vertical member whereof is arranged to enter the top portion of the intermediate filter-section C. The intermediate filter-section is in its turn provided with an angular flange 22 at its bottom portion, the vertical member whereof is arranged to enter the lower filter-section D, and the said lowermost filter-section D is provided with a bottom angular flange 26, but the vertical member of this flange has ventilating-apertures 27 produced therein. The intermediate filter-section C is provided with ventilating openings or apertures 23 near its top and is strengthened by exterior stays 24, which will also serve to steady the central portion of the filter in the casing A. The upper portion of the lower section D is also provided with apertures 25.

The filter-sections are of less diameter than the casing, and consequently an air-space 28 is formed between the casing and the filtering-receptacles, as is particularly shown in Fig. 1. The space is not closed at the top, and communication is established between the bottom portion of the space 28 and the cistern through the ventilating opening or openings 27 in the bottom filter-section D.

The upper filter-section is provided with a perforated bottom 29, covered at its upper face with a wire-gauze 30 of suitable mesh. Coarse sand is placed in suitable quantities upon the gauze and gravel is placed on the coarse sand. The central or intermediate filter-section C is provided with a perforated bottom 31, the gauze being omitted, and this intermediate section is filled to a greater or less extent with coarse broken charcoal or other purifying material. The bottom filter-section D is of like construction to the upper one, except that it has the apertures at the top and at the bottom; but the bottom 32 is perforated and covered by a gauze 33, upon which layers of coarse sand and layers of gravel are placed.

In order that the various filter-sections may be readily manipulated after having been separated, each is provided with a handle, the handles being designated as 34, 35, and 36, and also preferably the ventilating-openings 14 at the bottom portions of the casing are covered upon the inside by a netting or a gauze 37 in order to exclude insects.

A base-flange 38, which is usually made of an ornamental character and which has apertures 39 therein, is provided for the casing in order that the latter may rest upon a convenient support, and the weight of the filter need not be entirely sustained by the cistern or the pipe leading thereto. The down-spout 18, with which the top of the filter is connected, should be made to slide to a certain extent in order that the top may be removed from the filter and the interior parts taken out.

The water from the down-spout will enter at the top of the filter and will be directed by the lip 19 of the top over the entire surface of the filtering material in the top filter-section, the lip also preventing the water from entering the space 28. After the water has percolated through the material in the top filter-section it will pass through the material in the intermediate section and from thence through the filtering material in the lowermost section D, passing from this section to the cistern.

In order to clean the filter, the cover is unscrewed from the down-spout, the spout is raised, and the filter-sections B, C, and D are taken from the casing and separately washed, and the filtering material is changed, if necessary. Thorough ventilation is secured in the use of this filter by the air passing from the cistern into the bottom of the casing, thence through the apertures 27 at the periphery of the bottom filter-section into the air-space 28 and through the apertures 25 into the lowermost filter-section and through the apertures 23 into the intermediate filter-section, and finally the air will pass off through the top of the filter to the down-spout and out to the atmosphere at the roof.

Having thus described my invention, I claim as new and desire to secure by Letters Patent—

1. In a filter, a casing provided with a cover, and apertures near its base, filtering-receptacles located within the casing, the receptacles being of less diameter than the diameter of the casing, the lowermost filtering-receptacle being provided with openings at its margin below its bottom, communicating with the space between the casing and the filtering-receptacles, sundry of said filtering-receptacles being provided also with apertures in their top portions, for the purpose set forth.

2. In a filter, a casing having a removable top and provided with apertures near its bottom, independent filtering-receptacles located within the casing, being placed one over the other, the filtering-receptacles being of less diameter than the diameter of the casing, the lowermost filtering-receptacle being provided with a flange at its bottom, resting upon the bottom of the casing, which flange is apertured, and sundry of the filtering-receptacles being also provided with apertures near their top portions, for the purpose set forth.

3. In a filter, the combination, with a casing having apertures near its bottom, a removable cover provided with an inwardly-flaring annular lip, the cover having an inlet, and the bottom being provided with an outlet-opening, of a series of independent receptacles arranged to fit one upon the other and each to contain filtering material, the lowermost receptacle being provided with an apertured flange which rests upon the bottom of the casing, the filtering-receptacles being of less diameter than the diameter of the casing, whereby an air-space is provided between the filtering-receptacles and the casing, communicating with the outlet of the bottom through the apertures in the flange of the bottom receptacle, as and for the purpose specified.

WILLIAM A. MADDIN.

Witnesses:
FRANK H. GRUBB,
BEVERLY BERRY.